Inventors.
Fritz-Otto Zeyen &
Karl-August Springstein.
By [signature] Atty.

Inventors.
Fritz-Otto Zeyen, &
Karl-August Springstein.
By. [signature] Atty.

Inventors.
Fritz-Otto Zeyen, &
Karl-August Springstein.
By [signature] Atty.

United States Patent Office 2,969,709

Patented Jan. 31, 1961

2,969,709

ELECTRONIC NEGATIVE-POSITIVE CONVERSION AND CORRECTION OF GRADATION CURVES OF COLOR EXTRACTIONS

Fritz-Otto Zeyen, Heikendorf, near Kiel, and Karl-August Springstein, Kiel, Germany, assignors to Dr.-Ing. Rudolf Hell Kommanditgesellschaft, Kiel-Dietrichsdorf, Germany, a German company Filed July 31, 1957, Ser. No. 675,429

Claims priority, application Germany Aug. 4, 1956

5 Claims. (Cl. 88—14)

This invention is concerned with an electronic system for negative-positive conversion and correction of the course of the gradation curves of photographic color extractions of multicolor copies to be reproduced, including color photographs, pictures, prints and the like.

In the color reproduction technique, color extractions are produced photographically, for making printing forms or plates for the individual colors which are printed superimposed, by making of the original color picture with interposition of suitable color filters three black-white exposures, namely, a yellow, a red, and a blue extraction. These color extractions are thereupon copied, each upon a metal plate covered by a light-sensitive gelatin layer, and the metal plates are afterward subjected to plural-stage etching operations.

A multicolor print made in the above described manner would be unsatisfactory so far as the natural color reproduction is concerned, due to basic shortcomings of the color filters and the printing colors, which cannot be remedied, and the color extractions accordingly must be corrected. This may be accomplished, for example, by retouching the color extraction negatives or photomechanically by the use of suitable masks, or by subsequent corrective etching in whole or in part, of the etched printing forms for the individual colors.

So called color scanner methods and apparatus have recently been developed for carrying out the color correction of the photographic color extractions automatically by means of electronic devices. The color extractions are thereby simultaneously photoelectrically scanned, point by point, in successive lines, and the transparencies of the corresponding picture points are converted into proportional electrical voltages. Video signals fluctuating from point to point are in this manner obtained for each color extraction, which are conducted to the input of an electronic computer. The computing machine establishes in less than one millisecond, for each picture point, from the uncorrected color voltages, corrected video signals which are obtained at the output thereof and after amplification conducted to lamps which record the corrected color extractions simultaneously point for point upon unexposed photographic plates.

The operation of such an electronic color correction machine requires maintaining a predetermined standard gradation course of the uncorrected photographic color extractions. Further correction requirements, for example, always carrying out the photographing with the same predetermined color filters, and always employing identical printing colors and identical printing paper, all of which can nowadays be reproduced with sufficient accuracy, can be relatively easily fulfilled.

The situation is, however, different so far as the factors are concerned which determine the course of gradation of the color extraction plates. The gradation course of a photographic material depends, as is known, upon the chemical composition of the photosensitive layer, upon the exposure time, upon the chemical composition of the developer, its temperature and duration of the developing, etc.

Experience has taught that it is possible to reproduce with sufficient accuracy a photographic material and a developer, once decided upon, but that it is difficult to maintain a predetermined exposure time, a predetermined developer temperature and a predetermined developing duration. Accordingly, the color extractions to be corrected exhibit varying gradation courses which must be carried into a standard gradation course prior to the manual correction and especially prior to the automatic correction in an electronic color correction machine.

It may however also happen, outside of the lacking coincidence of the gradation course of the color extractions with a standard gradation course, that it is desirable to change the course of the tone value of the color extraction, be it for reasons of eliminating color impressions of the initial copy or for changing the color reproduction in the print, in individual parts or in whole, as compared with the copy to be reproduced.

It is known, in the photo-mechanical masking method for color correction and matching of the gradation course of the color extractions with a standard gradation course, to photograph together with the color picture and with the same color filter a so-called gray scale or wedge and to compare the resulting gray scale negative with a standard gray scale negative. This method permits ascertaining only the deviation of the factual gradation course from a predetermined standard, and the photographic production of additional intermediate negatives must be repeated until there is obtained a satisfactory coincidence of the density and the gradation of the resulting negatives with a predetermined standard density and gradation.

In the case of intaglio printing, as compared with relief-printing, it is, in addition, necessary, to produce from the color extraction negatives prior to or after the color correction, color extraction positives which are thereafter copied upon the light sensitive gelatin layer of the metal plates to be etched. The necessity for this procedure will be apparent upon considering the fact that in intaglio printing, the depth of the etched depressions of the printing forms is proportional to the blackening of the picture image and that the gelatin remains water-soluble only at the unexposed places where the etching medium enters to the printing form.

The present invention avoids the drawbacks of the photographic method of carrying out the negative-positive conversion by copying and producing successive color extractions by repeated copying until the required standard gradation course is obtained. The invention provides an electronic method of negative-positive conversion and correction of the course of the gradation curves of the photographic color extractions of multicolor copies to be reproduced, in the presence of deviations from a predetermined standard gradation course, by employing a gray scale positive photographed together with the copy by the use of the same color filters.

The negative-positive conversion and the correction of the gradation course are in accordance with the invention accomplished by converting the transparencies of the gray scale negative into proportional electrical voltages (negative voltages), thereupon converting these voltages in accordance with a selectable and adjustable function, corresponding to the photographic copy process based upon a plurality of gradation curves, into other voltages (positive voltages), indicating the discrete values of the positive voltages allotted to the transparency stages of the gray scale negative, and finally effecting coincidence of the indicated values with the predetermined values by comparison of these values with corresponding predetermined standard values and by alteration of the functional relationship.

In accordance with a further feature of the invention, the new method is carried out with apparatus comprising a periodically reciprocable table carrying the gray scale negative, a relatively stationary photoelectric scanning device which scans the transparencies of the reciprocating gray scale and converts them into proportional voltages, a cathode beam tube with afterglow screen upon which are recorded a number of parallels to a horizontal base line (abscissa), the spacings of which (ordinates) are allotted to the base line of the transparencies of the gray scale positive according to a predetermined standard gradation course, an adjustable negative-positive conversion circuit which reproduces the photographic copy process electrically, and means for conducting the scanning voltages of the photocell means to the input of the converter and to the horizontal deflection plates of the cathode beam tube while conducting the output voltages of the converter to the vertical deflection plates of the cathode tube.

In accordance with a further object and feature of the invention, the negative-positive conversion circuit for the electrical reproduction of the photographic copy process comprises three or more adjustable distortion stages to the inputs of which is conducted the negative voltage to be converted; the first distortion stage being effective to distort the input voltage in accordance with a variable initially rapidly and thereafter very slowly increasing function; the second stage being effective to distort the input voltage in somewhat different manner with a decreasing differential quotient; and the third stage containing a regulable amplifier with a rectilinear amplification characteristic; furthermore, a successive addition or totalizing stage in which the distorted output voltages are added, followed by a subtraction stage in which the summation voltage is subtracted from an adjustable constant voltage; and finally, a generator for producing the constant minuend voltage.

The various objects and features of the invention will appear from the following description which is rendered below with reference to the accompanying drawings.

The theory of the method according to the invention will first be explained with reference to Figs. 1–3.

Figure 1:
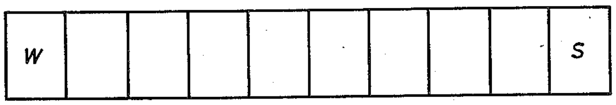
Fig. 1 shows a gray-scale positive.

Fig. 1 shows a gray-scale having a number of blackened stages—in the illustrated example eight stages—which follow each other according to any assumed law, for example, in the manner customary in the art so that the difference of blackening or darkening (quotient of opacity) of two successive stages is constant. The gray scale is produced upon paper as a positive picture when the original copy to be reproduced is a similar picture, and as a diapositive if the copy to be reproduced is transparent, whereby the first (left) field is white (W) or transparent and the last field (right) is black (S) or opaque.

Figure 2:
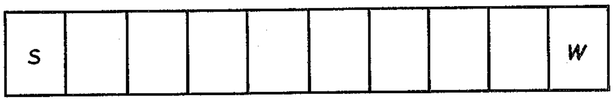
Fig. 2 shows a gray-scale negative produced from the positive of Fig. 1.

When this gray scale positive is photographed together with the multicolor copy to be reproduced, there will result the gray scale dianegative according to Fig. 2 in which transparency and opacity are reversed, so that the first (left) field becomes opaque (S) and the last (right) field becomes transparent (W). The law according to which the individual blackened or darkened stages of the negative follow one another is not anymore the same as in the case of the gray scale positive, due to the gradation course of the employed photographic exposure material, that is, due to the non-linear relationship between the blackening and exposure. If the transparencies of the gray scale negative are plotted horizontally in a rectangular coordinate system and the respectively associated reflections or transparencies of the gray scale positive are plotted vertically, the dependence between the two values will be represented by the course of the curve resembling a falling exponential function as shown in Fig. 3 in the curve indicated by a solid line. If the gradation of the material of the negative changes within certain limits, the dependence will be represented, for example, by a curve course lying between the two limit curves shown in dotted lines, illustrating the scattering of the gradations of the material of the negative by a certain desired value. Now, if a certain standard gradation course is determined, which may be represented by the central solid line curve, and designating the transparencies of the gray scale negative as $T_N$ and the reflections or transparencies of the gray scale positive as $R_p$ and $T_p$, respectively, there will be a non-linear relationship between the two values $$R_p \text{ or } T_p = f(T_N, p)$$

wherein $p$ designates a group or series parameter at whose variation the curves extend and which produces the predetermined standard gradation course for a certain selected value $P_0$.

Figures 4, 5:
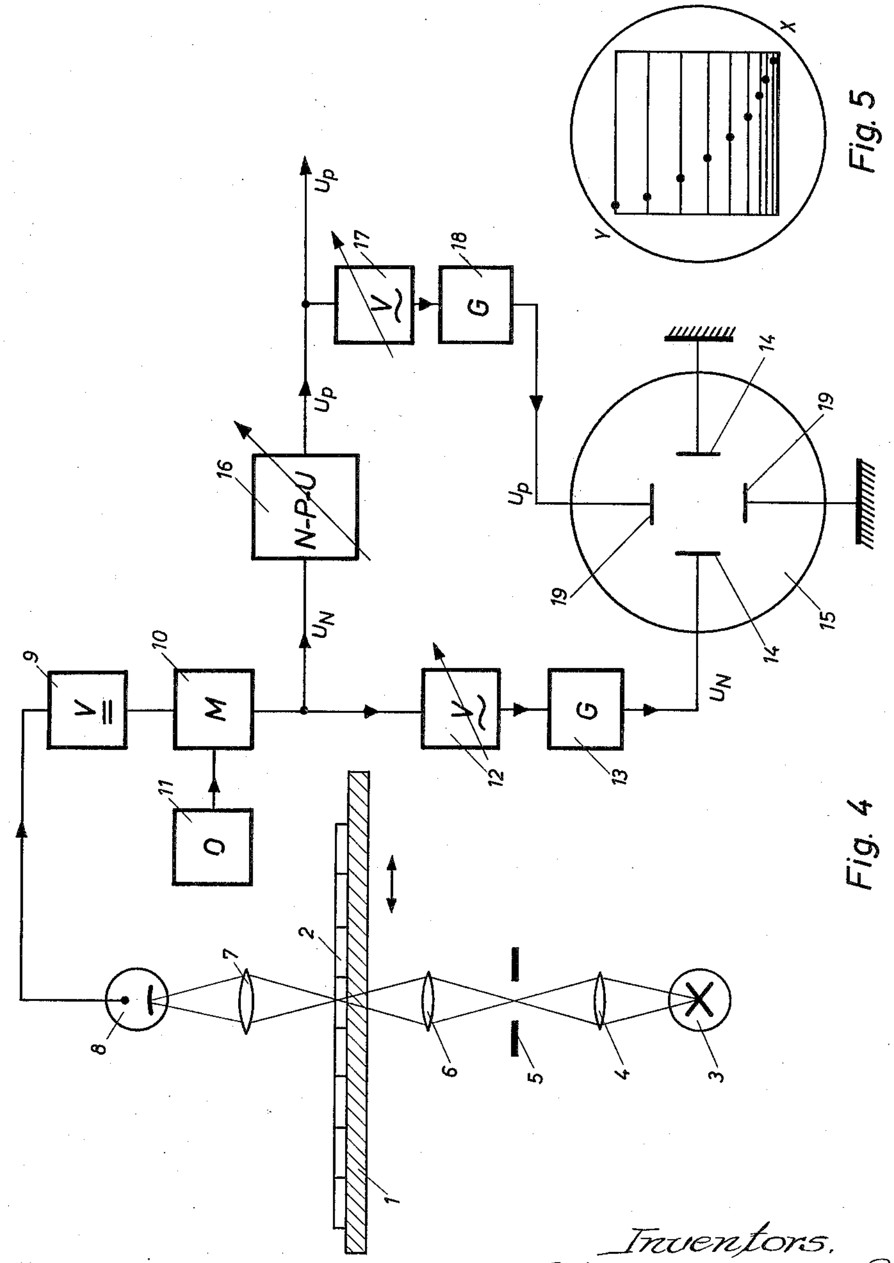
Fig. 4 illustrates apparatus and a circuit arrangement for practicing the method according to the invention.
Fig. 5 shows the parallels to the base line upon the screen of a cathode ray tube.

Fig. 4 shows a block diagram of apparatus and a circuit arrangement for practicing the method according to the invention.

Numeral 1 indicates a reciprocating table which may be the scanning table of the color correction machine, with the transverse advance switched off, the table carrying the gray scale negative 2. Numerals 3–8 indicate a photoelectric scanning device comprising a light source 3, an illumination optics 4 for illuminating the aperture of the diaphragm 5, an imaging optics 6 which pictures the illuminated diaphragm aperture upon the gray scale 2, and the optics 7 which pictures the diaphragm point upon the gray scale 2 on the cathode of the photocell 8. The current produced by the photocell 8 is proportional to the light-energy passed by the gray scale, that is, proportional to its transparency. The photocell currents are amplified in the amplifier 9 and conducted to one input of the modulator 10. An oscillator 11 delivers to the other input of the modulator 10 a carrier frequency. The carrier frequency voltage delivered by the oscillator 11 is amplitude-modulated in the modulator 10 by the amplified photocell direct voltages from the amplifier 9.

Instead of using a modulator and an oscillator for producing the carrier frequency, the scanning light beam of the photoelectric scanning device may be in known manner periodically interrupted by a rotating apertured disk, to produce the carrier frequency.

The output of the modulator 10 branches into two circuits. One circuit extends over an alternating current amplifier 12 and a rectifier 13 to the horizontal deflection plates 14 of a cathode ray tube 15; the other circuit extends by way of a negative-positive converter 16 to the color correction machine and at the same time by way of an alternating current amplifier 17 and a rectifier 18 to the vertical deflection plates 19 of the cathode ray tube 15.

Figure 6:
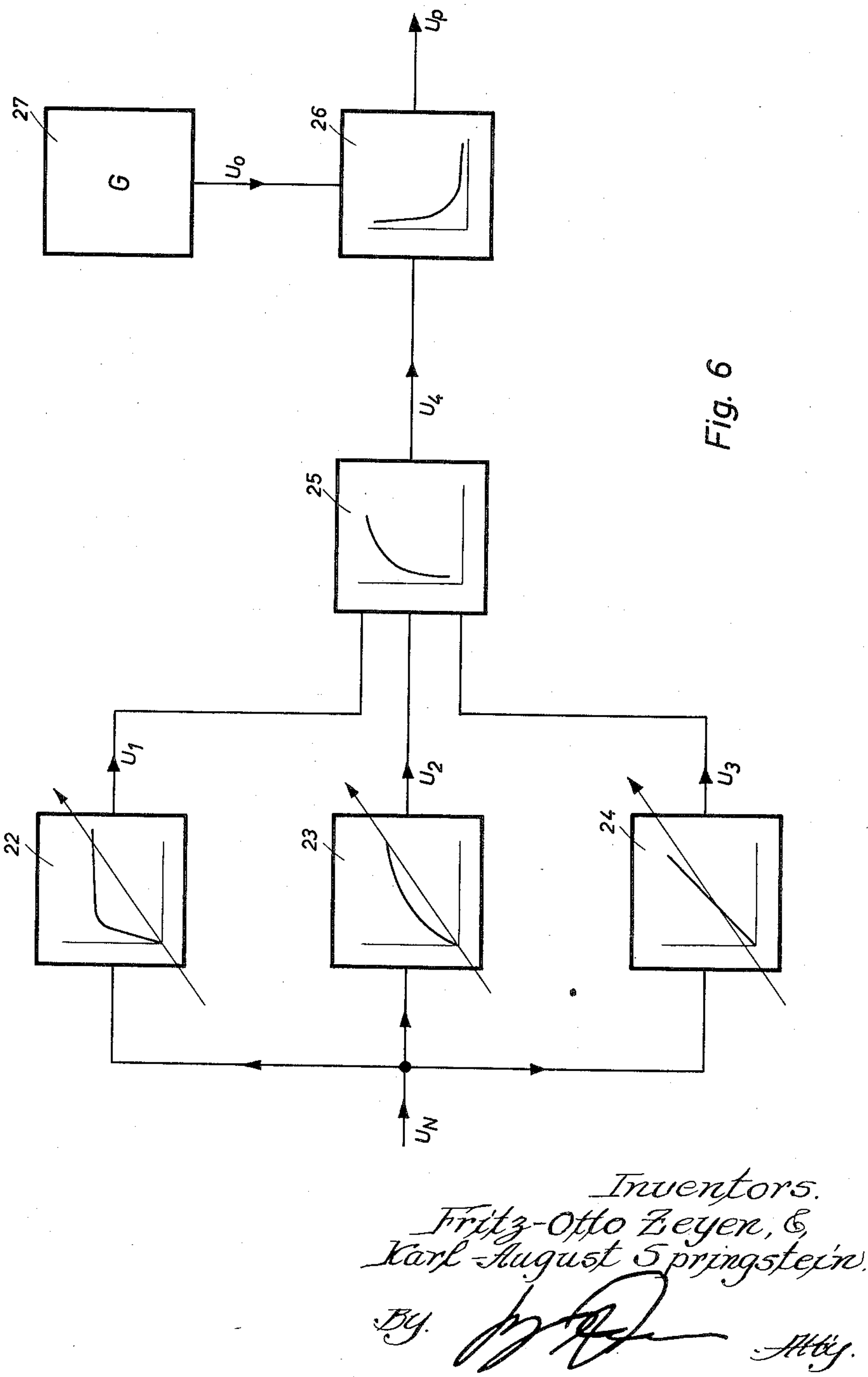
Fig. 6 shows an embodiment of the negative-positive converter.

The negative-positive converter 16, which will be presently described more in detail with reference to Fig. 6, effects the conversion of the voltages delivered thereto, which are proportional to the transparencies of the gray scale negative, into voltages, which are respectively proportional to the reflections and to the transparencies of the gray scale positive. The conversion constitutes an electrical reproduction of the photographic copy process incident to the transition of a negative to a positive.

The converted voltages, accordingly, correspond to voltages that would result from the photoelectrical scanning of the gray scale positive obtained by copying the gray scale negative by the use of a certain gradation course.

Figure 3:
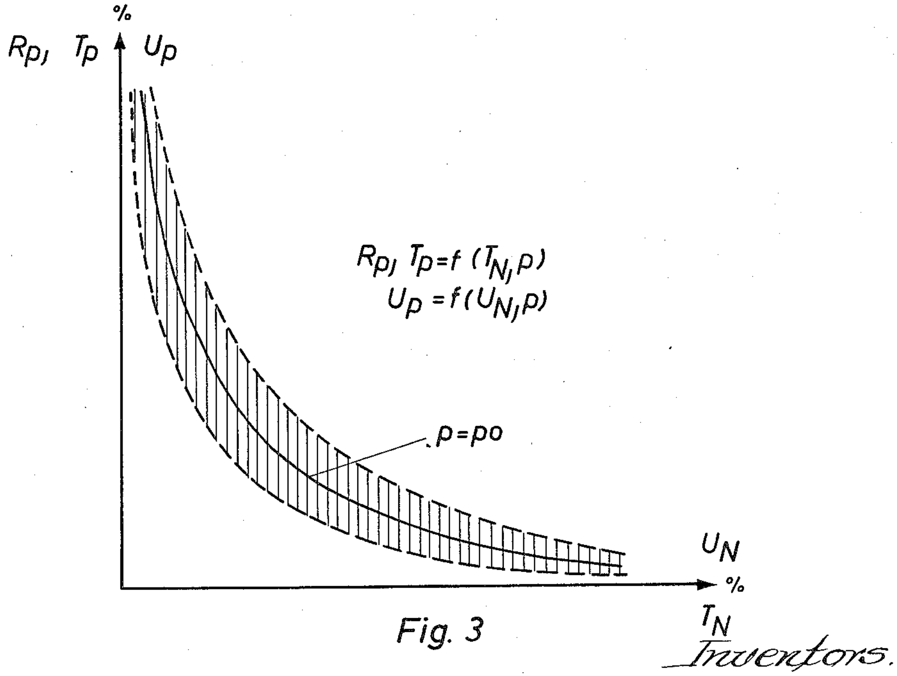
Fig. 3 shows the the dependence of the reflection or transparence of the gray-scale positive on the transparence of the gray-ladder negative.

The conversion is effected in accordance with the functional relationship illustrated in Fig. 3, representing a series of gradation curves. In accordance with the relation $$T_p \text{ or } R_p = f(T_N, p),\ p \text{ series parameter}$$

between the reflection or transparency of the positive and the transparency of the negative, there will result, for the proportional voltages $U_p$ and $U_N$ between these two values $$U_p = f(U_N, p)$$

whereby a whole series of voltage curves is passed incident to variations of the series parameters. This variation of the series parameter is likewise electrically reproduced by adjustment of distortion stages in the negative-positive converter. The negative-positive converter accordingly permits selective adjustment of a whole series of voltage courses.

The cathode beam of the cathode tube 15 is deflected horizontally in accordance with the transparency values of the scanned gray scale negative and vertically in accordance with the reflection or transparencies of a gray scale positive, in each case with a certain gradation course. Since the blackening or darkening of the gray scale is not continuous but in successive individual discrete stages, the particular lawfulness being immaterial, the cathode beam will not produce a continuous curve upon the viewing screen, but individual discrete dots or points corresponding in number to the number of the stages of the gray scale. The after glow of the viewing screen should be at least equal to the scanning duration of the gray scale so that the successively produced image dots become visible simultaneously. The image width upon the screen, that is, the abscissa scale may be adjusted as desired by regulation of the amplification at 12. The maximum vertical deflection of the cathode beam, that is, the ordinate scale, may be adjusted as desired by regulation of the amplification at 17. Alternating voltages may be fed to the vertical deflection plates instead of direct voltages to produce upon the viewing screen illuminated vertical lines of different lengths instead of illuminated dots.

In Fig. 5 there are shown upon the viewing screen a number of parallels (ordinates) with reference to a base line (abscissa)—eight parallels in the illustrated example—whose ordinates are allotted to the transparencies of the gray scale positive in accordance with the predetermined standard gradation course. The ordinates of the parallels represent individual discrete functional values of the function $U_p = f(U_N, P_0)$, belonging to the discrete transparency values of the gray scale positive employed, based upon a standard gradation course corresponding to the selection of a predetermined series parameter value $p = p_0$. The ordinates of the dot or line succession produced by the cathode beam, which will generally deviate from the recorded ordinates due to deviation of the factual from the standard gradation course, are brought in alignment with the ordinates on the viewing screen, by adjustment of the negative-positive converter. The factual gradation course of the gray scale negative is in this manner electrically converted into the standard gradation course.

In case of each successive color extraction, the gradation course is newly adjusted and corrected by jointly photographing the standard gray scale positive and scanning of the gray scale negative resulting therefrom. The dot or line succession produced upon the viewing screen by the cathode beam is independent of the length of the gray scales (different size of plates) and independent of the scanning speed as well as the scanning direction.

The horizontal deflection of the cathode beam by the scanning voltages derived from the gray scale negative (negative voltages), which are proportional to its transparencies, is not absolutely necessary; vertical deflection of the cathode beam by the output voltages of the converter (positive voltages) will suffice. In such a case, a succession of vertical dots will appear upon the viewing screen. However, since the corresponding dots will appear crowded toward the base line, due to the falling course of the gradation curves, it will be difficult to differentiate between them in the neighborhood of the base line. It is accordingly advisable, for better differentiation of these dots, to draw them horizontally apart by the horizontal deflection. This procedure is also in accordance with the customary manner of realizing the course of a curve.

Fig. 6 shows in block diagram manner an embodiment of the negative-positive converter 16 indicated in Fig. 4. The technical realization of the corresponding circuit represents an electronic analog computer.

The input voltage $U_N$ which is to be converted is fed to three distortion stages 22, 23, 24. The first distortion stage 22, which may be realized, for example, by an electronic tube over-controlled to its saturation range, distorts the input voltage $U_N$ in accordance with a variable, initially quickly and thereafter monotonously very slowly rising function $U_1 = f_1(U_N)$. The second distortion stage 23, which may again be realized by an over-controlled electronic tube, likewise distorts the input voltage in accordance with a variable initially quickly and thereafter relatively slowly monotonously rising function $U_2 = f_2(U_N)$ with a course that is somewhat different from that produced by the distortion stage 22. The third stage 24 may be realized by a linear amplifier with regulable amplification, producing from the input voltage $U_N$ an adjustable linearly dependent output voltage $U_3 = f_3(U_N)$.

The three output voltages $U_1$, $U_2$, $U_3$, from the three distortion stages 22, 23, 24 are fed to the inputs of a serially positioned addition or totalizer stage 25, in which the three voltages are added, delivering an output voltage $$U_4 = U_1 + U_2 + U_3 = f_1(U_N) + f_2(U_N) + f_3(U_N) = f_4(U_N)$$

such output voltage having a course which is similar to the course of the function $l - e^{-ax}$. The summation or total voltage $U_4$ is subtracted from a regulable constant voltage $U_0$ delivered by a generator 27, in a subtraction stage 26 which delivers the output voltage $$U_p = U_0 - U_4 = U_0 - f_4(U_N) = f(U_N)$$

such output voltage having a course which is similar to the course of a falling exponential function as represented by any of the gradation curves shown in Fig. 3.

By independently adjusting the operation of the three distortion stages 22, 23, 24, the course of the gradation curves may be altered within certain limits, corresponding mathematically to a variation of the series parameter $p$, thereby making it possible to match the series parameter to a predetermined standard gradation course.

The voltages employed may be direct or alternating current voltages. Alternating current voltages are preferred because they can be better controlled so far as amplification is concerned. It is to be observed in this connection that the distorted voltages are incident to addition and subtraction in phase with the input voltage $U_N$ and the constant voltage $U_0$.

Changes may be made within the scope and spirit of the appended claims.

We claim:

1. In a system for correcting and matching the course of gradation curves of photographic color extractions of a multicolor copy which is to be reproduced, wherein an original gray scale positive with fixed darkened areas is for the production of each color extraction always photographed together with the multicolor picture to obtain a gray scale negative, apparatus for satisfying, in the presence of deviations from a desired standard gradation course, the socalled gray requirement, comprising means for producing first electrical voltages proportional to the gradations in the gray scale on the negative, means for converting said first voltages to second voltages whereby the first voltages are modified by a variable functional relationship between densities of the negative and the positive due to a chosen photographic copying procedure, means for comparing those of the discrete values of said second voltages which according to said functional relationship reflect transparencies of the gray scale negative with corresponding values of transparencies of the original gray scale, and means for altering said functional relationship so as to bring the gray scale negative values obtained into agreement with those of the original.

2. A system and cooperation of parts according to claim 1, wherein said means for producing first electrical voltages includes a photoelectric device for scanning said gray scale negative, a cathode beam tube having an afterglow screen and exhibiting a plurality of parallels with reference to a base line, the spacing between said parallels from said base line corresponding to the transparencies of the original gray scale, a negative-positive converter device for electrically representing the photographic copy procedure, means for connecting the output of said photoelectric scanning device respectively with the input of said converter device and with the deflection plates of said cathode ray tube which effect deflection of the cathode beam parallel to lines appearing upon the screen thereof, and means for connecting the output of said converter device respectively with the other pair of deflection plates of said cathode ray tube and with the input of a color correction device.

3. A system and cooperation of parts according to claim 1, wherein said means for producing first electrical voltages includes a periodically reciprocating carriage for supporting said gray scale negative, a relatively stationary photoelectric scanning device for scanning the transparencies of said gray scale negative, means controlled by said scanning device for producing said first electrical voltages, a cathode ray tube having an afterglow screen exhibiting a plurality of parallels with reference to a base line, the spacing between said parallels corresponding to the transparencies of the gray scale positive in accordance with a predetermined standard gradation course, an adjustable negative-positive converter circuit for electrically reproducing the relationship between densities of negative and of positive arising from a predetermined copying procedure, means for conducting the voltages derived from said scanning to the input of said converter and to the horizontal deflection plates of said cathode ray tube, and means for conducting the output voltages produced by said converter to the vertical deflection plates of said cathode ray tube.

4. A system and cooperation of parts according to claim 3, wherein said altering means includes a plurality of at least three adjustable distortion stages, means for feeding to the inputs of said stages the voltages to be converted, which are derived from the scanning of said gray scale negative, one of said distortion stages being effective to distort the input voltage in accordance with a variable initially quickly and thereafter very slowly monotonously ascending function, another one of said distortion stages being effective to distort said input voltage somewhat similarly in accordance with a variable monotonously ascending function with decreasing differential quotient, a third one of said distortion stages constituting an adjustable amplifier with linear amplification characteristic, a totalizer stage for adding the distorted voltages delivered by said distortion stages, a generator for delivering an adjustable constant minuend voltage, and a device for subtracting the totals of said added voltages from said constant minuend voltage.

5. A system and cooperation of parts according to claim 4, wherein at least one of said distortion stages comprises an electronic tube in which the degree of distortion is adjusted by the value of the grid input voltage and by the control of the characteristic impedance.

References Cited in the file of this patent

UNITED STATES PATENTS

| | | |
|---|---|---|
| 2,469,935 | Sweet | May 10, 1949 |
| 2,480,424 | Simmon | Aug. 30, 1949 |
| 2,499,039 | Simmon | Feb. 28, 1950 |
| 2,565,399 | Simmon | Aug. 21, 1951 |
| 2,652,327 | Condax | Sept. 15, 1953 |
| 2,692,825 | Sportelli | Oct. 26, 1954 |